(12) United States Patent
Pennington et al.

(10) Patent No.: US 7,904,601 B2
(45) Date of Patent: Mar. 8, 2011

(54) INTERNET SERVICE LOGIN USING PREEXISTING SERVICES

(75) Inventors: Havoc Pennington, Westford, MA (US);
Donald Fischer, Westford, MA (US);
Bryan Clark, Westford, MA (US);
Owen Taylor, Westford, MA (US);
Colin Walters, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 490 days.

(21) Appl. No.: 11/565,046

(22) Filed: Nov. 30, 2006

(65) Prior Publication Data
US 2008/0134343 A1    Jun. 5, 2008

(51) Int. Cl.
*G06F 15/16* (2006.01)
*G06F 12/00* (2006.01)

(52) U.S. Cl. ........................................ 709/250; 709/218
(58) Field of Classification Search .......... 709/217–219, 709/227–229, 203, 250; 726/28
See application file for complete search history.

(56) References Cited

U.S. PATENT DOCUMENTS

| 7,093,020 | B1 * | 8/2006 | McCarty et al. | 709/229 |
| 7,120,928 | B2 * | 10/2006 | Sheth et al. | 726/4 |
| 7,487,214 | B2 * | 2/2009 | Qureshi et al. | 709/206 |
| 2002/0194226 | A1 * | 12/2002 | Sheth et al. | 707/517 |
| 2002/0194502 | A1 * | 12/2002 | Sheth et al. | 713/201 |
| 2004/0122959 | A1 * | 6/2004 | Lortz | 709/229 |
| 2005/0114527 | A1 * | 5/2005 | Hankey et al. | 709/228 |
| 2005/0240671 | A1 * | 10/2005 | Beyer et al. | 709/227 |
| 2006/0101119 | A1 * | 5/2006 | Qureshi et al. | 709/206 |
| 2006/0129828 | A1 * | 6/2006 | Shi | 713/182 |

* cited by examiner

*Primary Examiner* — Zarni Maung
(74) *Attorney, Agent, or Firm* — MH2 Technology Law Group LLP

(57) ABSTRACT

Embodiments of the present invention provide a system and method for logging a client into an internet service using a preexisting service. In order to login, the user may select a link that triggers the service to send login information to the user via a preexisting service, such as instant messaging or email. In some embodiments, the user is sent a link via their preexisting service. The user then logs into the service by selecting the link.

16 Claims, 9 Drawing Sheets

From: logins@mugshot.org
To:
CC:
Subj: Sign in to Mgshot

Click here to sign in

FIG. 7

INTERNET SERVICE LOGIN USING PREEXISTING SERVICES

FIELD OF THE INVENTION

The present invention relates to internet services and, more particularly, to systems and methods of logging into internet services.

BACKGROUND OF THE INVENTION

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, Internet services, such as social networking, offer a mix of features and tools, including as message boards, games, journals, web logs ("blogs"), and instant messaging. Instant messaging refers to a form of real-time communication between two or more people based on typed text. Typically users identify themselves to an Internet service by providing login information, such as a username or and a password. This can very often be cumbersome because a user must first direct a browser to the Internet service's login page, and then provide the login information. Thus, it may be desirable to provide a simpler method and system for logging onto an Internet service.

In addition, user's often must manage multiple accounts and login information. For example, many users may manage ten or more accounts for email, instant messaging, etc. Therefore, it may be desirable to provide a method and system for logging onto an Internet service that minimizes the number of accounts a user must manage.

BRIEF DESCRIPTION OF THE DRAWINGS

The accompanying drawings, which are incorporated in and constitute a part of this specification, illustrate several embodiments of the invention and together with the description, serve to explain the principles of the invention. In the figures:

FIG. 7 illustrates an exemplary email with a login link that may be provided by the open overlay service in accordance with the principles of the present invention.

DESCRIPTION OF THE EMBODIMENTS

Embodiments of the present invention provide a way for users to easily login to an Internet or online services, such as social networking sites. For example, in some embodiments, methods and systems provide a way for users to login to a service using one of their preexisting services, such as email or instant messaging.

Reference will now be made in detail to the exemplary embodiments of the invention, which are illustrated in the accompanying drawings. Wherever possible, the same reference numbers will be used throughout the drawings to refer to the same or like parts.

Figure 1:
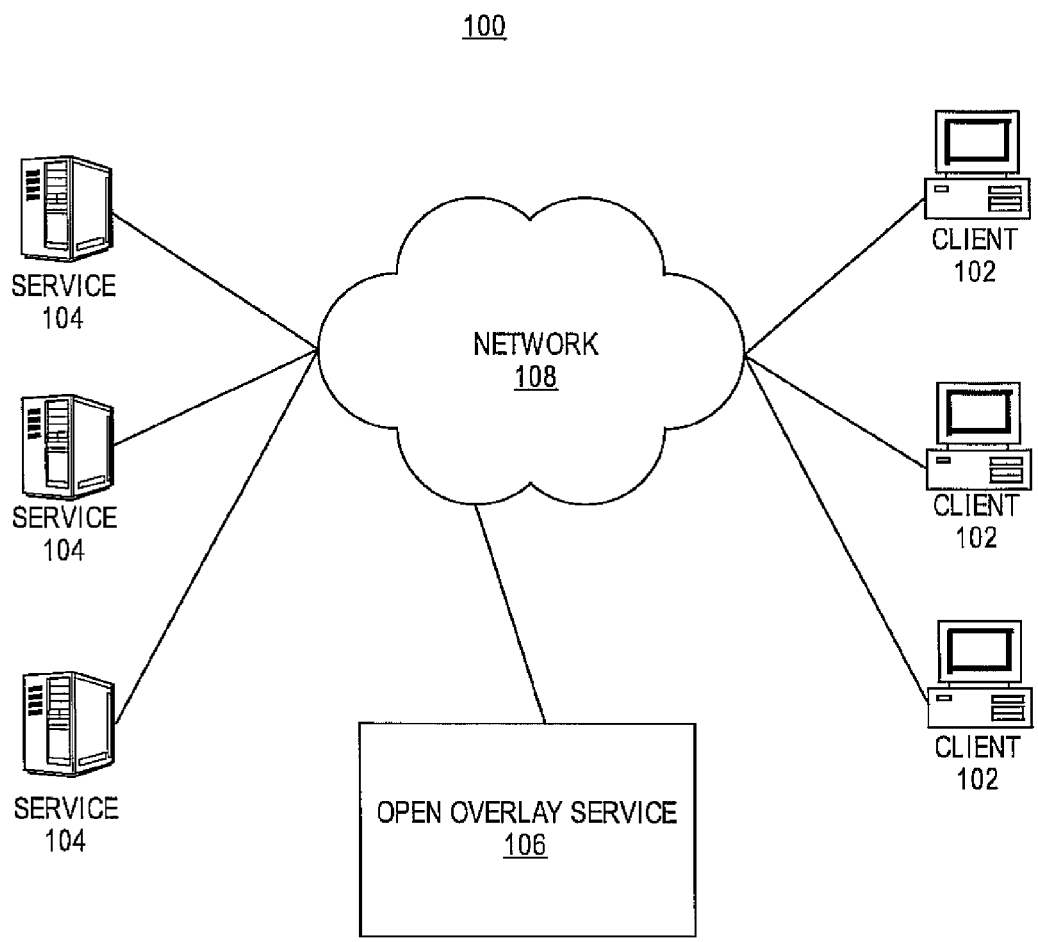
FIG. 1 illustrates an exemplary system in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
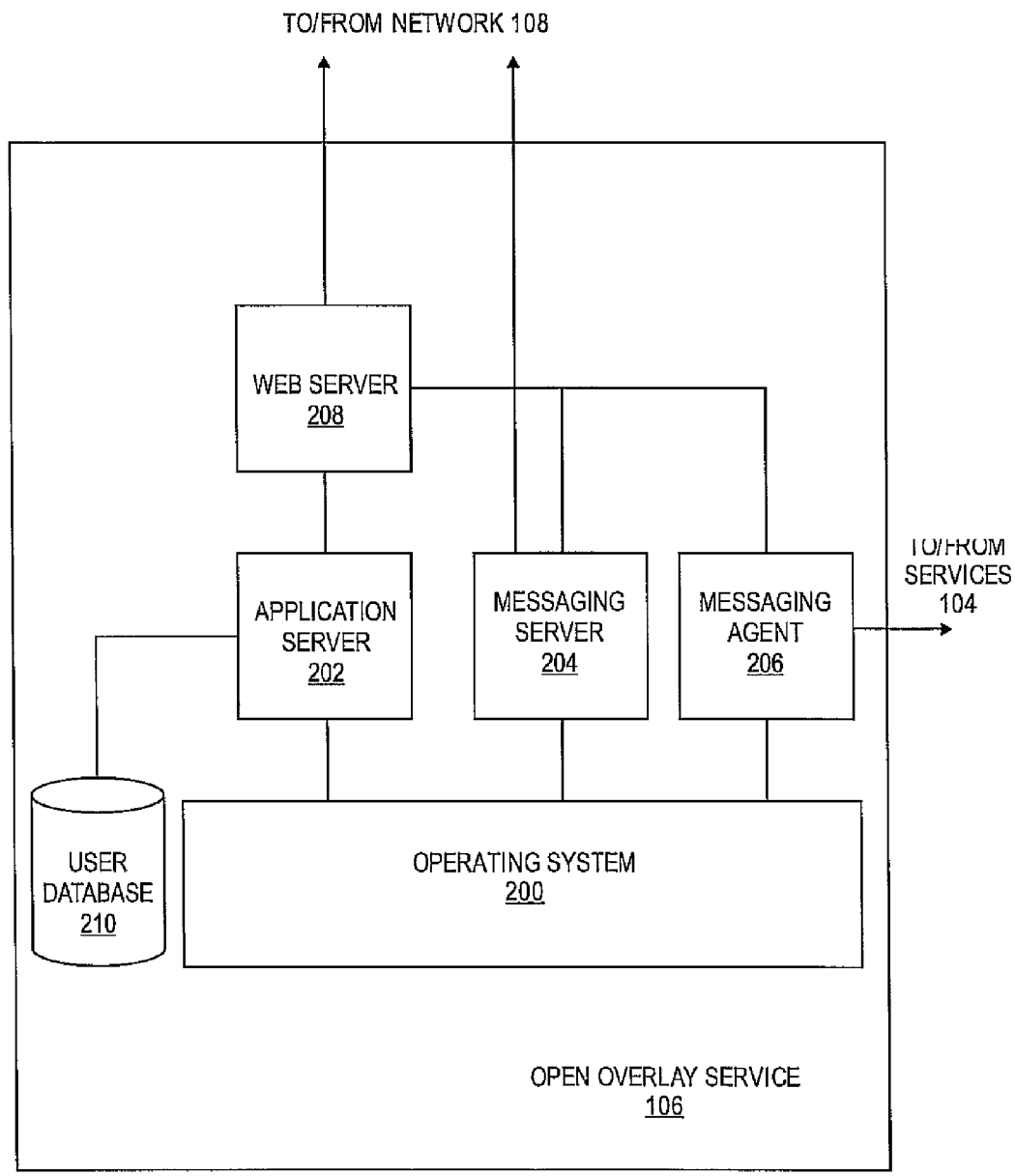
FIG. 2 illustrates exemplary architecture for an open overlay service consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging-agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202.

For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

Figure 3:
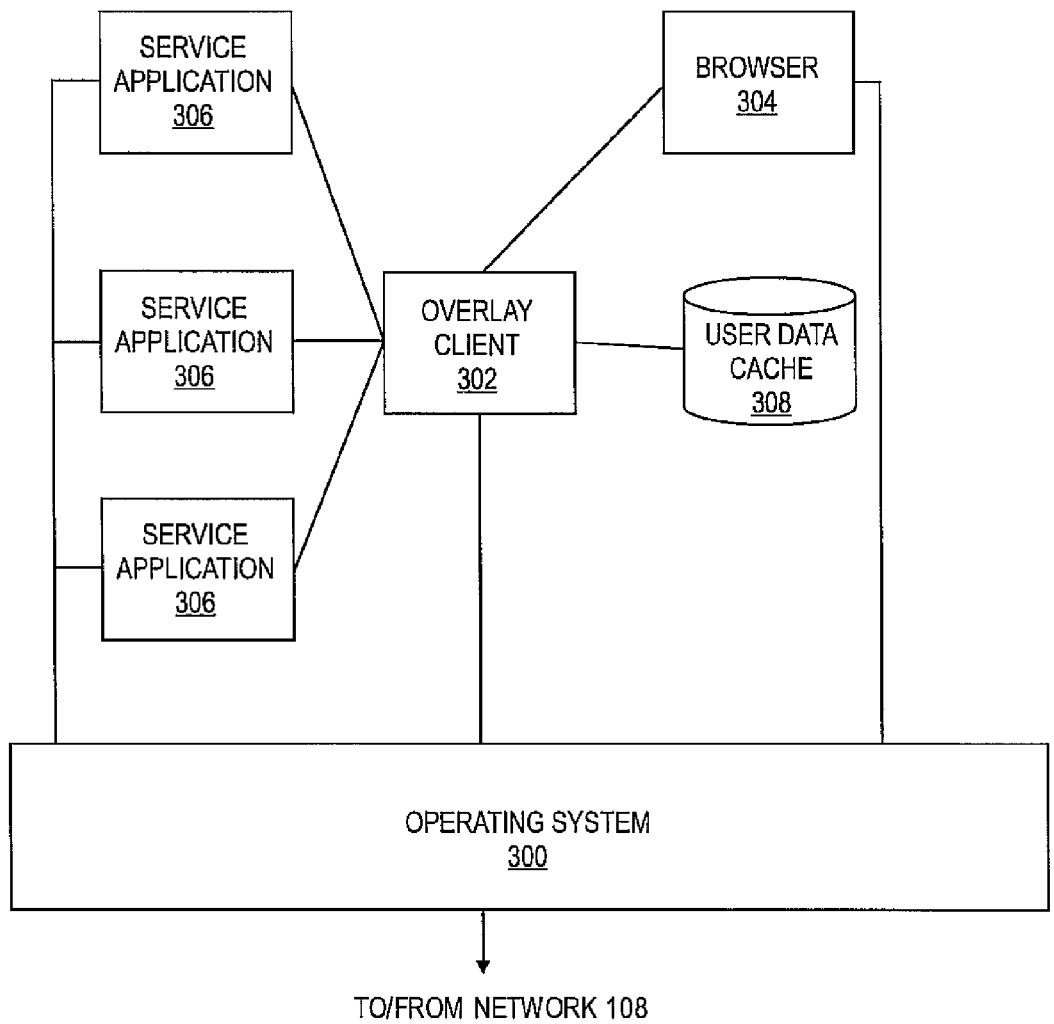
FIG. 3 illustrates an exemplary architecture for clients consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like.

In order to illustrate some of the features of open overlay service 106 that provide a live social context, a login feature that relies on a user's preexisting online service account will now be described. As noted, many users maintain multiple accounts with various online services. Typically, one or more of these accounts is predominantly used by the users. For example, many users may rely heavily on a particular email account or an instant messaging service, such as AOLs Instant Messaging Service.

In some embodiments, open overlay service 106 takes advantage of the predominant use of a particular account by the user, and thus, allows the user to avoid having to remember or provide a separate login. Open overlay service 106 may prompt the user to establish ownership of a preexisting account. In some embodiments, instant messaging accounts may be preferred due to the real-time nature of instant messaging services and because identities of the sender and recipient of instant messages can be readily identified. However, one skilled in the art will recognize that other types of accounts, such as text messaging accounts on a mobile phone, email accounts, etc., may also be employed.

In some embodiments, open overlay service 106 is configured to require users to login via a preexisting account, such as instant messaging account, as the primary way of logging in. In order to establish ownership of a preexisting account, open overlay service 106 may request that client 102 provide an account identifier, such as an instant messaging screen name, email address, and the like. In response, messaging agent 206 may send a login link to the provided account. For example, this login link may be in the form of a uniform resource locator UL) that comprises a one-time key or code that uniquely identifies the user and the preexisting account. The user must then utilize their preexisting service to provide the login link back to open overlay service 106. By providing the login link, the user thus establishes ownership of that account.

Figure 4:
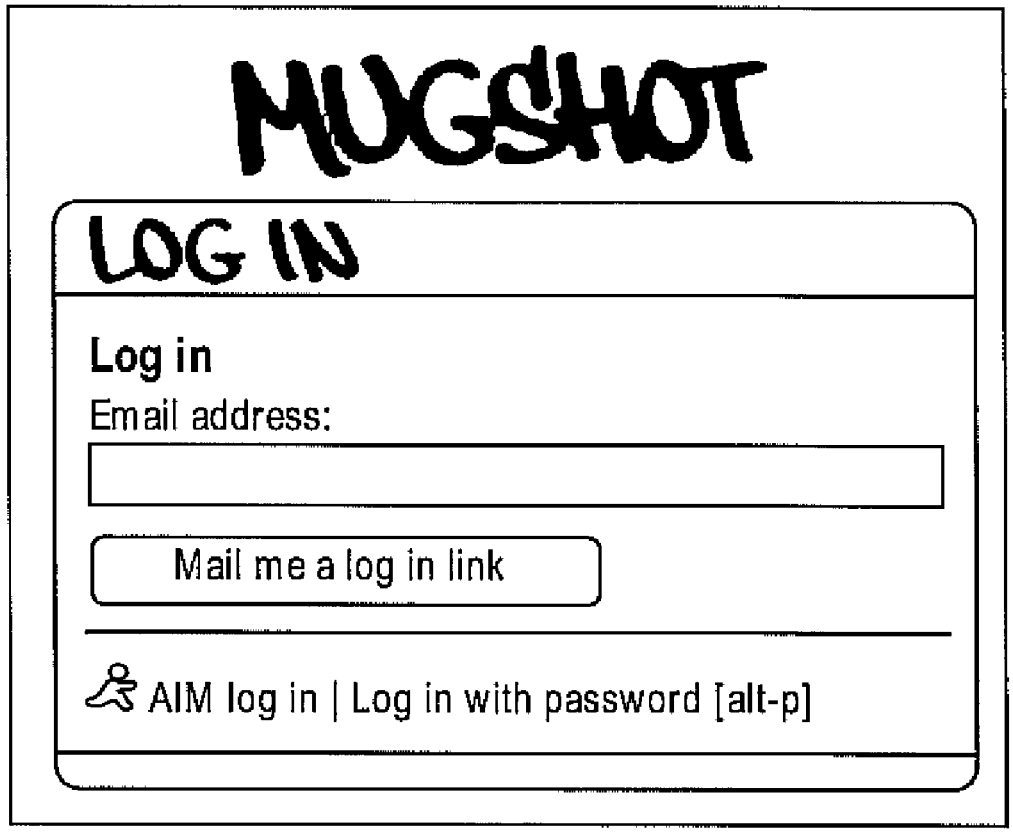
FIGS. 4-6 illustrates an exemplary login page that may be provided by the open overlay service in accordance with the principles of the present invention.
Figure 5:

FIGS. 4-5 illustrates exemplary login pages that may be provided by open overlay service 106. In general, the login pages of open overlay service 106 are intended to minimize the passwords that a user must remember. Typically, once a user has logged in to open overlay service 106, that person is not logged out automatically and doesn't require passwords to log back in. Instead, embodiments of the present invention offer multiple different options for logging in. As shown FIGS. 4-5, the user may login by requesting a login link via email, or by directly providing an email address and password.

Figure 6:
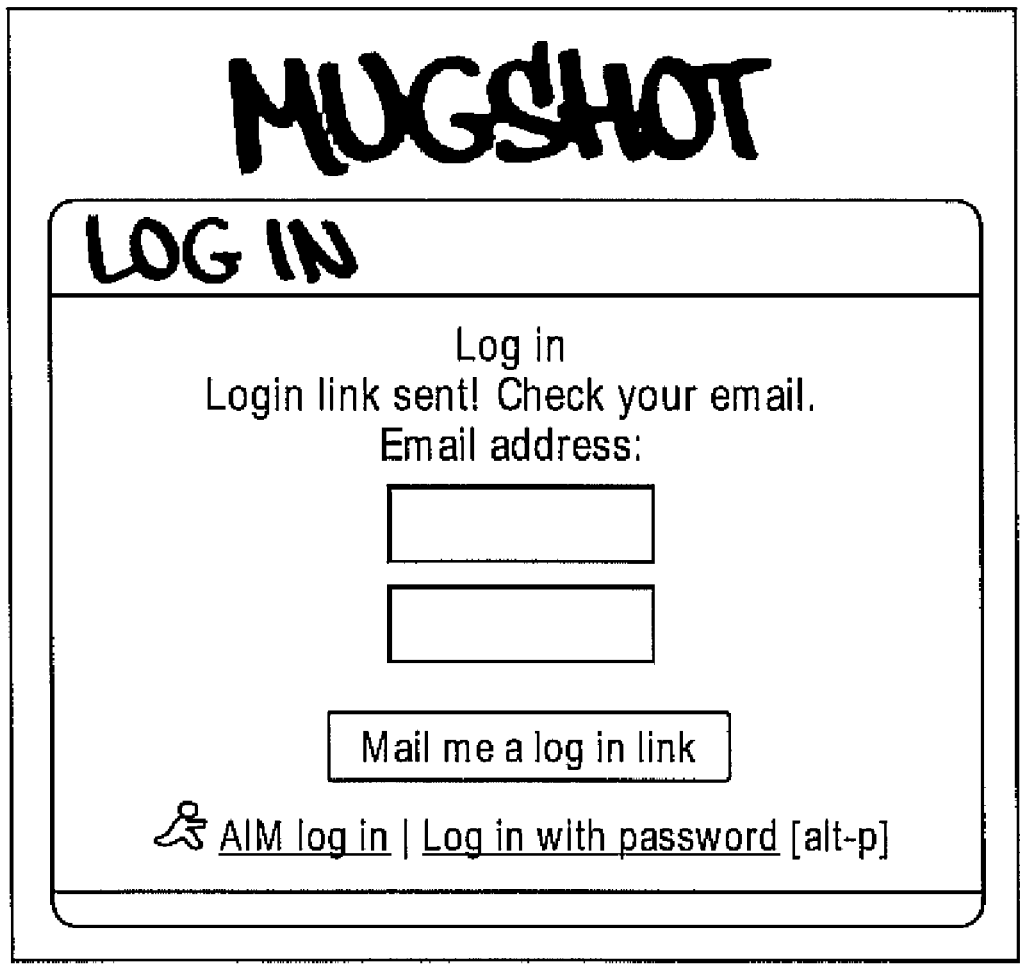

As shown in FIG. 6, once the user has requested the login link or submitted an email address and password, open overlay service 106 may provide an acknowledgment page. For the convenience of the user, the login link may be considered valid by open overlay service for various lengths of time, such as a day, a week, etc. This allows a user to rely on a login link for a certain period of time in order to log in and out of open overlay service easily.

FIG. 7 illustrates an exemplary email with a login link that may be provided by the open overlay service 106. As shown, the user has received an email from open overlay service 106 and the email contains a link which logs the user in to open overlay service 106.

Figure 8:
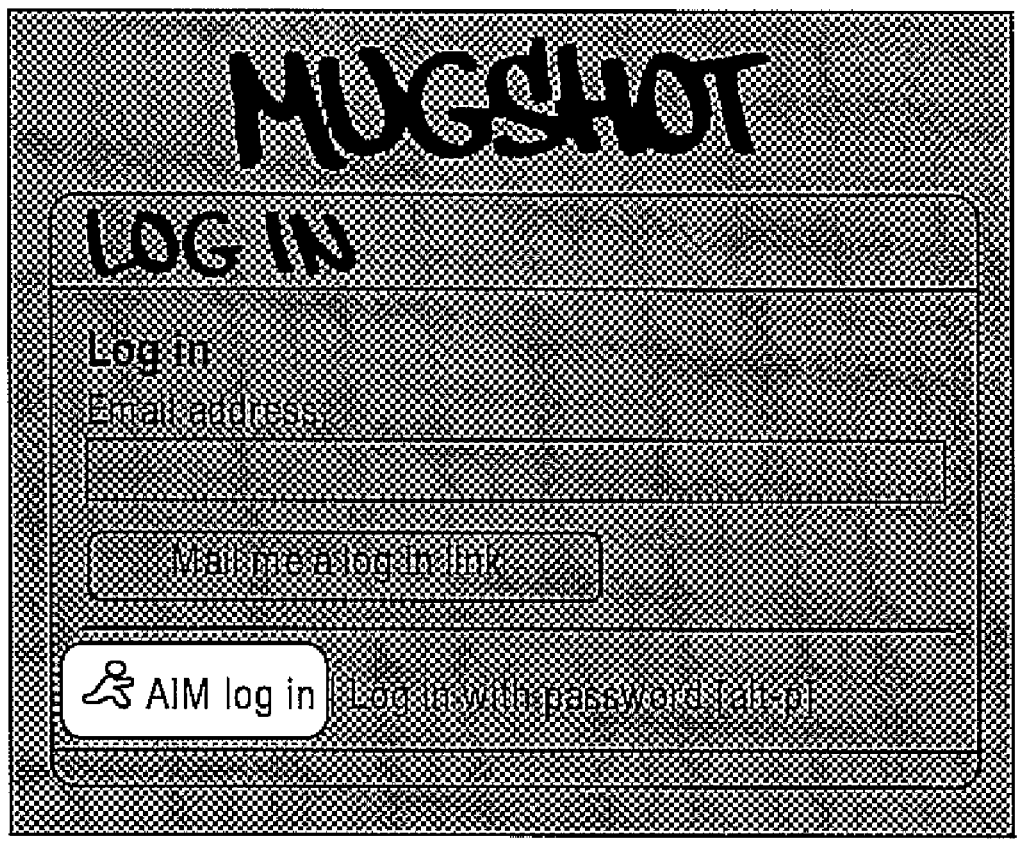
FIGS. 8-9 illustrate exemplary instant messages with login links that may be provided by the open overlay service in accordance with the principles of the present invention.
Figure 9:
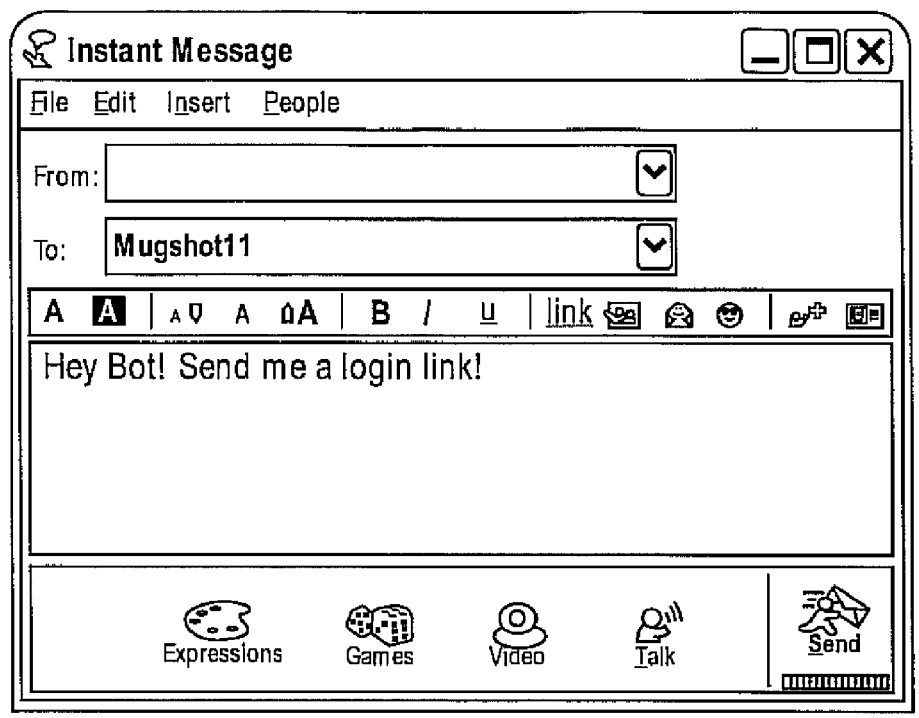
Figure 9:
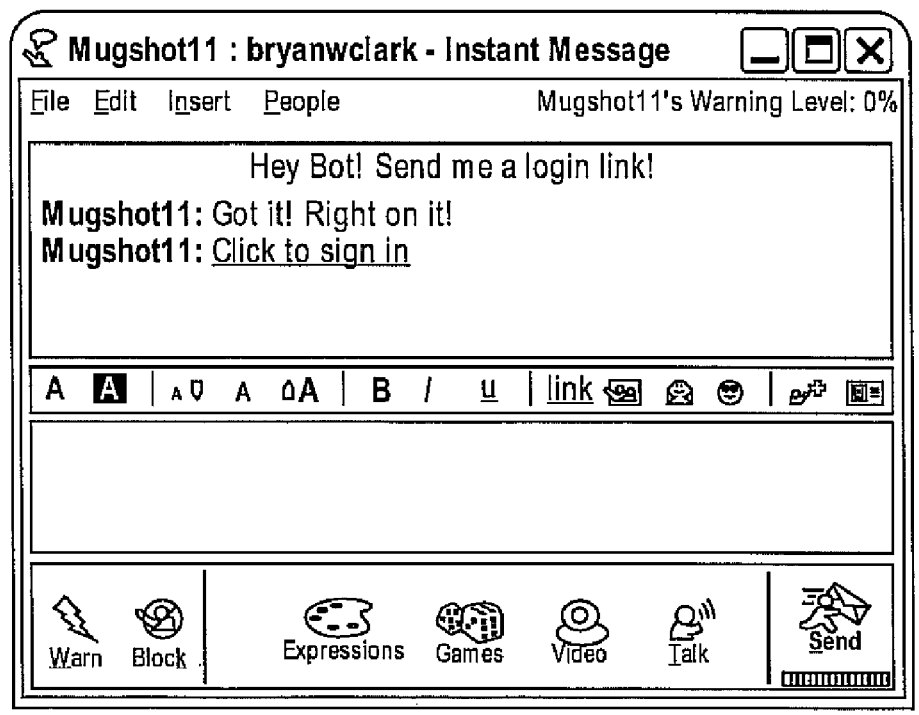

FIGS. 8-9 illustrate exemplary instant messages with login links that may be provided by the open overlay service 106. Instant messaging may be used in some embodiments because of the speed in which they operate. Any form of messaging service of the user may be implemented as part of the present invention.

As shown in FIG. 8, the login page displays an icon associated with an instant messaging service screen name. Once a user clicks on this icon, open overlay service 106 is configured to use application 306 to send login links to instant messaging service 104 at client 102. In response, open overlay service 106 sends application 306 an instant message to provide pre-populated login information to the user at client 102. The instant message may include a unique identifier or link that allows the user to access open overlay service 106. In some embodiments, this link is a URL that triggers browser 304 to navigate to open overlay service 106. This URL may be sufficient for the user to login over a period of time, such as an hour, a day, etc. Alternatively, the URL may be configured as a one-time link that permits the user to login only once. Accordingly, in order to login, the user merely has to select the link, which directs their browser 304 to navigate to open overlay service 106.

Alternatively, as shown in FIG. 9, the user at client 102 may send an instant message to open overlay service 106 and request a login link. For example, open overlay service 106 may publish a particular screen name for use in login transactions. In response to receiving an instant message for its screen name, open overlay service 106 sends application 306 a response instant message to provide pre-populated login information to the user at client 102. As noted, the instant message may include a unique identifier or link that allows the user to access open overlay service 106. Accordingly, in order to login, the user merely has to select the link in the instant message, which directs their browser 304 to navigate to open overlay service 106.

Once the user has logged in, authorization information, such as cookie, may be stored in browser 304 at client 102. Open overlay client 302 may read this cookie from browser 304 and reuse this authorization information to login as well. That is, where the user has used browser 304 to log in to their preexisting service, open overlay service 106 sends credentials that can be repeatedly authenticated.

Other embodiments of the invention will be apparent to those skilled in the art from consideration of the specification and practice of the invention disclosed herein. For example, embodiments of the present invention may employ additional authentication measures to strengthen the security of the login process. In particular, in order to obtain an account, a user must first be invited by another user who already has an account with open overlay service 106. In addition, the user may provide an active mobile phone number. Open overlay service 106 may perform authentication and login using short messaging services (SMS) to that phone number. It is intended that the specification and examples be considered as exemplary only, with a true scope and spirit of the invention being indicated by the following claims.

What is claimed is:

1. A method of logging a client into an internet service using a preexisting service of a user, said method comprising:
   receiving, at a processor, an internet service login from the user via the preexisting service;
   sending, from the internet service to the user via the preexisting service, a message comprising a login link authorizing the user to access the internet service;
   receiving, at the internet service, a response from the user indicating a selection of the login link; and
   logging in the user to the internet service based on the selection of the login link.

2. The method of claim 1, wherein sending the message to the user that comprises the login link comprises sending the user an instant message that comprises the login link.

3. The method of claim 1, wherein sending the message to the user that comprises the login link comprises sending the user an email that comprises the login link.

4. The method of claim 1, wherein sending the message to the user that comprises the login link comprises sending the user a message that comprises a uniform resource locator.

5. The method of claim 1, wherein sending the message to the user that comprises the login link comprises sending the user a message that comprises a one-time uniform resource locator.

6. A non-transitory computer readable medium comprising computer executable program code for causing the processor to perform the method of claim 1.

7. A system configured to login users to an internet service via preexisting services of the user, said system comprising:
   a database comprising account information of preexisting services of the user;

a web server comprising a processor configured execute a messaging agent of one of the preexisting services to:
receive an internet service login request from a user, and send a message to the user comprising a login link authorizing the user to access the internet service; and
wherein the web server is further configured to receive a response from the user indicating a selection of the login link, to check the database based on the preexisting service from which the Internet service login request was received, and to log in the user to the internet service based on the check of the database.

8. The system of claim 7, wherein the message is an instant message that comprises the login link.

9. The system of claim 7, wherein the message is an email that comprises the login link.

10. The system of claim 7, wherein the message comprises a uniform resource locator.

11. The system of claim 7, wherein the message comprises a one-time uniform resource locator.

12. A method of logging a client into an internet service using a preexisting service of a user, said method comprising:
receiving, at a processor, a first message from the user via the preexisting service;
sending, from the internet service to the user via the preexisting service, a second message comprising a link authorizing the user to access the internet service;
receiving, at the internet service, a response from the user indicating a selection of the link; and
logging in the user to the internet service based on the selection of the link.

13. The method of claim 12, wherein the preexisting service is an instant messaging service.

14. The method of claim 12, wherein sending the second message to the user comprises sending the user a message that comprises a uniform resource locator having a unique key.

15. The method of claim 12, wherein sending the second message to the user that comprises the link comprises sending the user a message that comprises a uniform resource locator having a unique key, which expires after a predetermined amount of time.

16. A non-transitory computer readable medium comprising computer executable program code to cause the processor to perform the method of claim 12.

* * * * *